April 5, 1949.                S. T. FARRELL ET AL                2,466,218
                                    GEARING
                              Filed March 22, 1944
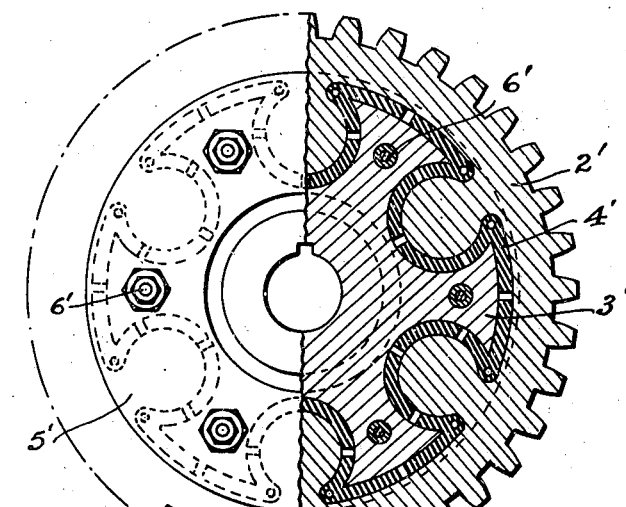
Fig. 1
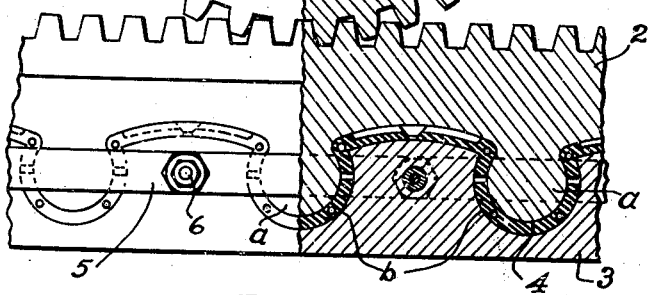
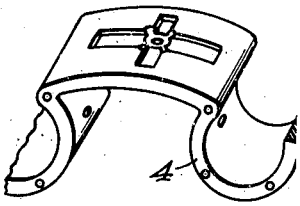
Fig. 2
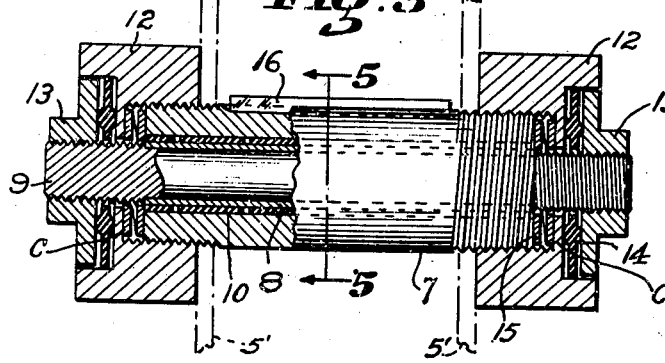
Fig. 3
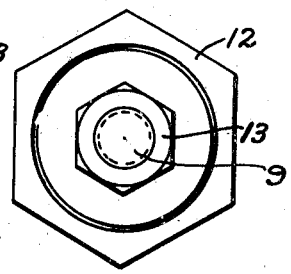
Fig. 4
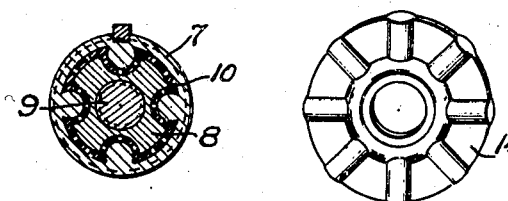
Fig. 5            Fig. 6
INVENTORS:
Sydney T. Farrell
BY Frederick L. Farrell,
J. H. M'Cready.
ATTORNEY.

Patented Apr. 5, 1949

2,466,218

UNITED STATES PATENT OFFICE 2,466,218

GEARING

Sydney T. Farrell and Frederick L. Farrell, Belmont, Mass.

Application March 22, 1944, Serial No. 527,603

3 Claims. (Cl. 64—27)

This invention relates to gearing and similar devices used in power transmission. It aims to devise a construction in which the danger of breaking teeth will be minimized. As is well known by those skilled in this art, it is a common experience to have teeth broken off a gear, rack, or other gearing member, due to excessive strain applied suddenly as, for example, in starting or stopping the mechanism in which it is included. This invention provides a construction in which the part subjected to such strain is cushioned to a sufficient degree to substantially eliminate the danger of breaking teeth from any shock which the member could reasonably be expected to withstand.

The nature of the invention will be readily understood from the following description when read in connection with the accompanying drawings, and the novel features will be particularly pointed out in the appended claims.

In the drawings,

Fig. 1 is a view, partly in side elevation and partly in vertical section, illustrating a gear and a rack cooperating therewith, both of these elements being constructed in accordance with this invention;

Fig. 2 is a perspective view of a portion of the cushioning member included in the rack illustrated in Fig. 1;

Fig. 3 is a view, partly in side elevation and partly in vertical section, of a cushioning bolt used in the construction shown in Fig. 1;

Fig. 4 is an end view of the bolt shown in Fig. 3;

Fig. 5 is a sectional view taken substantially on the line 5—5, Fig. 3; and

Fig. 6 is a perspective view of a friction member included in the bolt structure illustrated in Fig. 3.

Referring first to the rack illustrated in Fig. 1, it will be observed that it comprises a toothed section 2 and a supporting section 3 therefor, the former having ribs $a$ projecting into grooves or recesses $b$ formed in the latter. Also, these parts are so dimensioned as to provide a wavy space between them for the reception of an interposed cushioning member 4, a short length of which is better illustrated in Fig. 2. This cushioning element may be made of rubber, either natural or synthetic, or of other plastic compositions having resilient properties, and they may be compounded by methods well known in the plastic art to give them the desired degree of hardness and elasticity. For this purpose they may be reinforced, when necessary, by fillers of a granular, pulverulent, or fibrous character. Or, they may consist of fabric impregnated, coated, or laminated with elastic compositions so as to give them the necessary degree of toughness and stability for mechanical purposes, while still having the desired cushioning properties. Also, these parts may be perforated or manufactured by any desired method to give them sufficient porosity for cushioning purposes. Whether or not such porosity is necessary will depend upon the nature of the composition and the degree of cushioning effect required. In other words, if these cushioning members are made of rubber, then they must be provided with cutouts or holes, as shown in Figs. 1, 2, 3 and 5, or made in some manner and so supported that the rubber can flow. This is essential because solid rubber is substantially non-compressible.

The parts 2 and 3 may be manufactured by the common machine-shop methods and then assembled with the cushioning element 4 by sliding the parts together laterally, or in a direction generally parallel to the transverse plane of the teeth. If, however, it is not necessary to interlock the parts 2 and 3, then the ribs $a$ and the grooves $b$ may be made with sufficiently straight sides to permit assembly in a vertical direction. The parts, however, should be so constructed that ample portions of their surfaces through which the tractive effort is transmitted from one section to the other, are positioned at right angles to the line of traction. This clearly is true in Fig. 1 where the line of traction is through the line of bolts. If these surfaces are inclined there will be a camming action due to this transmission of the tractive effort which will tend to move one section of the gear member either up or down. In one case it will tend to separate these parts, and in the other case it will exert a rubbing action on the cushioning material, either of which effects is undesirable.

In the construction here shown this difficulty is avoided by making the projections or teeth with approximately semi-circular sides and shaping the grooves to a complemental form to receive these teeth or projections. Thus the maximum width circumferentially of each projection is at an intermediate point in its vertical height in the rack and in its radial height in the gear, and this is also true of each groove in either the gear or the rack. Also, these points of maximum width are positioned substantially in the line of traction. This construction of the ribs $a$ and the sockets or grooves $b$ in which they are located is such that the tractive force transmitted through opposed pairs of complemental faces of these intermeshing parts does not create any dominating component of that force in either an upward or a downward direction. In other words, any component so created in a direction tending to separate the parts 2 and 3 is substantially balanced by an oppositely directed component of the same force.

Whether or not the sections 2 and 3 are so made as to be inherently interlocking, the edges of the cushioning member 4 will be approximately flush with their lateral surfaces and in order to prevent any relative lateral movement of any of the sections 2, 3 or 4 out of cooperative relationship to each other, a retaining or cover plate 5 may be secured to each side of the rack. These two members can be bolted to either section 2 or 3 of the rack but should not be secured to both, since that would tend to defeat the function performed by the cushioning element. A freer action of this member also may be obtained, where necessary, by using cushioning bolts 6 such, for example, as that shown in Figs. 3 to 6, inclusive.

The gear illustrated in Fig. 1 is made up of elements essentially like those of which the rack is composed, and corresponding elements are indicated by the same, but primed, numerals. That is, the toothed section of the gear is shown at 2' supported on a core 3' with an intermediate cushioning member 4' radially isolating the two parts from each other. Cover plates, one of which is shown at 5', are provided at opposite sides of the gear and they preferably are held in place by cushioning bolts 6'. The plates serve to prevent any relative lateral shifting of the parts 2', 3' or 4'.

The cushioning bolt shown in Figs. 3 to 6, inclusive, is of a novel construction designed to be used in place of the bolts 6 and 6', Fig. 1, and includes a body comprising an outer tubular section 7 telescoped on a core section 8, the latter either being telescoped on a central shaft 9, or made integral with it, as desired. In either event the parts 8 and 9 are secured together so that they function as a single integral piece. This core member 8 is externally grooved longitudinally to provide recesses similar to those shown at b in Fig. 1; the outer member 7 has longitudinally extending ribs of a cross-sectional form like those shown at a in Fig. 1, and these two parts 7 and 8 are separated by an intermediate layer or sleeve 10 of cushioning material which may be of the same general nature as that shown at 4.

In this particular construction both ends of the bolt are equipped with nuts, although a head may be substituted for the nuts at one end, when desired, the head being made integral with either member 7 or 8. An important novel feature of this construction, however, is that the nuts at either end of this bolt are so arranged as to cooperate in a manner making it substantially impossible for either to back off accidentally. For this purpose the outer member 7 of the bolt body has a left-hand thread formed at each end thereof on which is screwed a nut 12. Similarly, the ends of the core section 9 are screw-threaded, but in the opposite direction, and cooperating nuts 13—13, having right-hand threads, are screwed on to these threaded ends.

This construction also includes a connection between the nuts 12 and 13 which makes either strongly resist any backing-off movement of the be observed that it has an inwardly extending integral flange c, and that between the face of this flange and the adjacent face of the nut 13 is a cushioning friction washer 14, which may be of the form illustrated in Fig. 6, or of any other suitable construction. Consequently, when the nut 12 has been tightened up against the part which the bolt secures in place, and the nut 13 also is turned up tightly, the cushioning member 14, which may be made of any of the compositions above described for the member 4, is strongly compressed and, partly for this reason and partly, also, because of its frictional surface characteristics, it tends to resist strongly any movement of one nut relatively to the other. If, therefore, the nut 12 tends to back off, such backing movement is in a right-hand direction and is transmitted through the friction washer 14 to the other nut 13 and tends to tighten this member on the part 9, it being recalled that this nut has a right-hand thread. Also, if the latter nut tends to back off, it acts through the friction member 14 in the same way to tighten the other nut 12.

Any backing-off movement of the nut 12 may further be resisted by interposing a flat spiral spring 15 between the end of the bolt body and the flange c of the nut 12 where it increases the frictional resistance of the threads of the nut on the body section 7. The same parts are shown in Fig. 3 at the opposite end of the bolt.

By using a cushioning bolt of this nature, any drag which the cover plate 5 or 5' in Fig. 1 may exert on the action of the cushioning material 4 or 4' is reduced, since the bolts themselves are radially cushioned. In fact, in a bolt like that shown, a cushioning effect of the core member 8 and the nuts 13—13 is provided both radially and axially, the latter resulting from the use of a cushioning washer at 14. Preferably the body of the bolt is keyed to the part in which it is anchored so that it cannot rotate relatively thereto. A key 16, Fig. 3, is provided for this purpose. In this figure the covers 5' of the gear illustrated in Fig. 1 are indicated by dotted lines, the intervening core or hub section 3', however, being omitted.

The manner in which the drag above referred to is created will be evident from an inspection of Fig. 1. If the bolts used at the point 6 were ordinary bolts, then they would lock the cover plates 5 rigidly to the part 3 and the sections of cushioning material in contact with the two side plates 5 at opposite sides of the rack would be compressed between the plates. Consequently, they could not respond as readily to cushion a sudden shock produced by a quick start of one of the members 2 or 3 lengthwise of the rack, or the quick stop of one of these members, as would be the case if these portions of the cushioning material 4 were not so clamped and confined. By using bolts like those shown in Fig. 3, in place of those shown at 6 in Fig. 1, this drag on the action of the cushioning material 4 is relieved to a high degree, and the cushioning member 4 is left substantially free to exert the normal cushioning action for which it is provided.

Assuming either the gear shown in Fig. 1 or the rack there illustrated drives the other, it will be evident that shock caused, for example, by any sudden starting or stopping movement of one will be cushioned within itself, and that its transmission through the other likewise will be cushioned in the latter. This action obviously greatly reduces the strain which otherwise would come on the very few teeth of these two members which are in intermeshing relationship at the instant of shock.

While we have herein shown and described a typical embodiment of our invention, it will be evident that the invention is susceptible of embodiment in other forms, and is applicable to a great variety of other situations, without departing from the spirit or scope of the invention.

Having thus described our invention, what we desire to claim as new is:

1. A gearing member comprising a toothed face section, a supporting section connected with said toothed section for movement in unison therewith, cushioning means through which said movement is transmitted from one section to the other, said cushioning means being in the form of a layer having one of its edges positioned at the lateral surface of said gearing member and said sections having faces separated by said means in an area perpendicular to the line of traction between said sections, a cover element secured to one of said sections and serving to hold said cushioning layer against movement out of place toward said lateral surface, and bolts securing said cover element in its operative position, said bolts being internally cushioned so that they do not interfere with the action of said cushioning means.

2. A gearing member comprising a toothed section, a supporting section connected with said toothed section for movement in unison therewith, resilient means through which said movement is transmitted yieldingly from one section to the other, said cushioning means being in the form of a layer having one of its edges positioned at the lateral surface of said gearing member, a cover element secured to one of said sections and serving to hold said cushioning layer against movement out of place toward said lateral surface, and bolts securing said cover in its operative position, said bolts being internally cushioned radially.

3. A gearing member comprising a toothed section, a supporting section connected with said toothed section for movement in unison therewith, and cushioning means through which said movement is transmitted from one member to the other, one of said sections being provided with projections and the other with sockets in which said projections are located, said projections and sockets being separated from each other by said cushioning means, and the adjacent faces of said projections and sockets including parts by means of which the traction force is mainly transmitted through said cushioning means from one of said sections to the other, said projections being of greater width in a circumferential direction at intermediate points in their height than at other points in said height, and the grooves being of a complemental form to receive said projections, said cushioning means being free to expand and contract sufficiently to cushion the transmission of shock from one of said sections to the other.

SYDNEY T. FARRELL.
FREDERICK L. FARRELL.

REFERENCES CITED

The following references are of record in the file of this patent:

UNITED STATES PATENTS

| Number | Name | Date |
| --- | --- | --- |
| 288,134 | Stone, Jr. | Nov. 6, 1883 |
| 1,017,819 | Sundh | Feb. 20, 1912 |
| 1,383,816 | Keller | July 5, 1921 |
| 1,928,763 | Rosenberg | Oct. 3, 1933 |
| 1,946,956 | Waseige | Feb. 13, 1934 |
| 2,105,702 | Scholtze | Jan. 18, 1938 |
| 2,270,583 | Forton | Jan. 20, 1942 |